United States Patent
Zeumer et al.

(10) Patent No.: US 10,961,896 B2
(45) Date of Patent: Mar. 30, 2021

(54) METHOD FOR MANUFACTURING A FLAP CARRIER FOR AN EXHAUST GAS FLAP

(71) Applicant: Eberspächer Exhaust Technology GmbH & Co. KG, Neunkirchen (DE)

(72) Inventors: Annika Zeumer, Wernau (DE); Steffen Schmitt, Ostfildern (DE); Stefanos Varelis, Leinfelden (DE); Ralf Hölsch, Epfendorf (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 107 days.

(21) Appl. No.: 15/810,689

(22) Filed: Nov. 13, 2017

(65) Prior Publication Data

US 2018/0135497 A1    May 17, 2018

(30) Foreign Application Priority Data

Nov. 14, 2016  (DE) .................. 10 2016 121 721.2

(51) Int. Cl.
| | |
|---|---|
| *F01N 13/08* | (2010.01) |
| *B23P 15/00* | (2006.01) |
| *B23K 26/38* | (2014.01) |
| *F02D 9/10* | (2006.01) |
| *F02D 9/04* | (2006.01) |
| *F16K 27/02* | (2006.01) |

(52) U.S. Cl.
CPC .............. *F01N 13/08* (2013.01); *B23K 26/38* (2013.01); *B23P 15/001* (2013.01); *F02D 9/04* (2013.01); *F02D 9/104* (2013.01); *F02D 9/107* (2013.01); *F16K 27/0218* (2013.01); *F01N 2240/36* (2013.01)

(58) Field of Classification Search
CPC ...... F01N 13/08; F01N 2240/36; F02D 9/107; F02D 9/1095; F16K 27/0218
See application file for complete search history.

(56) References Cited

U.S. PATENT DOCUMENTS

| 4,164,236 A | 8/1979 | Owen et al. |
| 4,289,297 A | 9/1981 | Nakanishi |
| (Continued) | | |

FOREIGN PATENT DOCUMENTS

| CN | 105804839 A | 7/2016 |
| CN | 107542580 A | 1/2018 |
| (Continued) | | |

OTHER PUBLICATIONS

Machine translation of WO2015111334A1 (Year: 2015).*

*Primary Examiner* — Moshe Wilensky
*Assistant Examiner* — Kyle A Cook
(74) *Attorney, Agent, or Firm* — McGlew and Tuttle, P.C.

(57) ABSTRACT

A method provides for manufacturing a flap carrier for an exhaust gas flap, especially for the exhaust gas stream of an internal combustion engine. The method includes providing a flap housing (50) and providing a stop ring (48). The stop ring (48) is inserted into the flap housing (50) in a position corresponding to an installed position. The stop ring (48) is fixed to the flap housing (50). Subsequently to fixing the stop ring (48) to the flap housing (50), at least one shaft opening (60, 62) for a pivot shaft carrying a flap diaphragm with at least one flap wing is inserted into the stop ring (48).

13 Claims, 4 Drawing Sheets

(56) References Cited

U.S. PATENT DOCUMENTS

| | | | |
|---|---|---|---|
| 5,345,057 A * | 9/1994 | Muller | B23K 26/1476 |
| | | | 219/121.71 |
| 5,630,571 A | 5/1997 | Kipp et al. | |
| 6,273,119 B1 * | 8/2001 | Foster | F02D 9/04 |
| | | | 137/15.25 |
| 6,338,467 B1 * | 1/2002 | Mabboux | F16K 1/2263 |
| | | | 251/305 |
| 6,390,447 B1 | 5/2002 | Mosher | |
| 7,357,372 B2 | 4/2008 | Shakagori et al. | |
| 2004/0021119 A1 | 2/2004 | Hattori | |
| 2008/0236542 A1 * | 10/2008 | Tanimura | F02D 9/107 |
| | | | 123/337 |
| 2012/0326069 A1 | 12/2012 | Takai et al. | |
| 2016/0178082 A1 * | 6/2016 | Bonanno | F02B 37/16 |
| | | | 251/84 |
| 2017/0089270 A1 * | 3/2017 | Oblinger | F02D 9/1045 |

FOREIGN PATENT DOCUMENTS

| | | |
|---|---|---|
| CN | 108019285 A | 5/2018 |
| DE | 25 03 015 A1 | 7/1976 |
| DE | 30 14 854 C2 | 12/1983 |
| DE | 37 40 613 A1 | 6/1989 |
| DE | 102008034341 A1 | 1/2010 |
| JP | 2001-099 333 A | 4/2001 |
| JP | 2002 323148 A | 11/2002 |
| JP | 2003-214 543 A | 7/2003 |
| JP | 2004 270769 A | 9/2004 |
| WO | WO-2015111334 A1 * | 7/2015 ............... F16K 1/22 |

\* cited by examiner

Fig. 1

(State of the Art)

METHOD FOR MANUFACTURING A FLAP CARRIER FOR AN EXHAUST GAS FLAP

CROSS REFERENCE TO RELATED APPLICATIONS

This application claims the benefit of priority under 35 U.S.C. § 119 of German Application 10 2016 121 721.2, filed Nov. 14, 2016, the entire contents of which are incorporated herein by reference.

FIELD OF THE INVENTION

The invention relates to a method for manufacturing a flap carrier for an exhaust gas flap, especially for the exhaust gas stream of an internal combustion engine.

BACKGROUND OF THE INVENTION

An exhaust gas flap that can be used, for example, in an exhaust system of an internal combustion engine and is disclosed in the subsequently published German Patent Application DE 10 2016 111 681 is generally designated by 10 in FIG. 1. A flap drive 12, which operates, for example, by means of an electric motor, is associated with the exhaust gas flap 10. A drive shaft 14 of the flap drive 12 is coupled to the exhaust gas flap 10 for the joint rotation with a pivot shaft 16. The pivot shaft 16 is carried pivotably about a pivot axis A in its two end areas 18, 20 via bearings, not shown, at a flap housing 22.

A flap diaphragm, which is generally designated by 24, is carried at the pivot shaft 16 in the interior of the flap housing 22, which is configured with an essentially circular cross section as well as with a correspondingly circular inner contour in this exemplary embodiment. The flap diaphragm 24 comprises two flap wings 28, 30, which are mounted with a respective mounting area 26 at the pivot shaft 16 by means of welding.

A wing stop 32, 34 having a ring segment-like configuration is provided at the flap housing 22 in association with each of the two flap wings 28, 30. The two wing stops 32, 34 are connected in substance to the inner circumference 36 of the flap housing 22. As is illustrated in FIG. 1, for example, on the basis of the wing stop 34, this [wing stop] extends without interruption along the inner circumference 36 of the flap housing 22 starting from a first circumferential end area 38 located close to the first axial end area 18 of the pivot shaft 16 to a second circumferential end area 40 located close to the second axial end area 20 of the pivot shaft 16. The wing stop 34 provides a stop surface 44 for the flap wing 30 at an end face 42 oriented in the direction of a flap housing longitudinal axis. The wing stop 32 also provides a corresponding stop surface on the opposite side.

SUMMARY OF THE INVENTION

An object of the present invention is to provide a method, with which a flap carrier, which interacts reliably with a flap diaphragm of an exhaust gas flap, can be manufactured in a simple manner.

According to the present invention, this object is accomplished by a method for manufacturing a flap carrier for an exhaust gas flap, especially for the exhaust gas stream of an internal combustion engine, comprising the steps: a) provision of a flap housing, b) provision of a stop ring, c) insertion of the stop ring into the flap housing in a position corresponding to an installed position, d) fixing of the stop ring to the flap housing, and e) after carrying out step d), insertion of at least one shaft opening at least into the stop ring for a pivot shaft carrying a flap diaphragm with at least one flap wing.

In the method according to the present invention, before one or two shaft openings are completely provided for a pivot shaft of a flap diaphragm, the stop ring interacting with the flap diaphragm for providing a defined seal is fixed to the flap housing. These openings are inserted or finished only later at positions provided for this such that they pass through not only the flap housing, but also the stop ring and optionally split the stop ring into a plurality of segments.

In order to be able to insert the stop ring into the flap housing in a simple manner, it is proposed that step a) comprise the provision of the flap housing with an inner surface that is essentially cylindrical in at least some areas, or/and that step b) comprise the provision of the stop ring with an essentially cylindrical outer surface.

For a stable connection of the stop ring to the flap housing, in particular also by taking into account the mechanical and thermal loads occurring in an exhaust gas duct system of an internal combustion system, it is proposed that steps a) and b) comprise the provision of the flap housing and of the stop ring, which are both made of metallic material, and that step d) comprise the fixing of the stop ring to the flap housing by means of welding.

In order to be able to further simplify the assembly process, it is proposed that step a) comprise the provision of the flap housing with at least one shaft opening. As an alternative, provisions may be made for step e) to comprise the insertion of at least one shaft opening into the flap housing and at least into the stop ring for a pivot shaft carrying a flap diaphragm with at least one flap wing.

In order to make it possible for a flap diaphragm with its two flap wings to be able to interact in the same manner with the stop ring at the two axially oriented end faces of same when pivoted in the direction towards a closed position, it is proposed that step e) comprise the insertion of at least one shaft opening at a central position of the stop ring in the direction of a ring longitudinal axis.

A stable pivot mount for the pivot axis of the flap diaphragm can be guaranteed, for example, by a shaft opening each being inserted at positions which are located opposite one another in relation to a flap housing longitudinal axis of the flap housing in step e).

If at least one shaft opening is inserted by means of laser cutting in step e), such a shaft opening may be provided in a simple and precise manner.

In a configuration that is structurally especially simple to achieve, it is proposed that the stop ring be provided as a closed ring in step b) and be inserted as a closed ring into the flap housing in step c).

As an alternative, provisions may be made for the stop ring to be provided as an open ring in step b) and to be inserted as an open ring into the flap housing (a flap tube) in step c). This makes possible the assembly such that the stop ring is provided with an external dimension oversize in relation to an internal dimension of the flap housing in step b), and that the stop ring is compressed radially in relation to a ring longitudinal axis and is held after the insertion in the installed position by means of spreading open radially at the flap housing in step c). Thus, no additional steps have to be provided in order to prevent an undesired relative motion between these two components before the permanent connection of the stop ring to the flap housing.

When using an open stop ring, i.e., one provided with an interruption area, in order to avoid leaks from forming in an area, in which this [stop ring] interacts with a flap diaphragm for providing a seal, it is proposed that a shaft opening passing through the flap housing and the stop ring be inserted in the area of an interruption area of the stop ring. In this connection, it is especially advantageous when an interruption area of the stop ring, at least when the stop ring is inserted into the flap housing in the circumferential direction, is smaller than or equal to the circumferential extension of a shaft opening to be inserted into the stop ring. It is thus guaranteed that by inserting a shaft opening also in the stop ring, a correspondingly dimensioned opening is created for the passage in the pivot shaft.

For a stable mounting of the pivot shaft on the flap carrier, it is proposed that after carrying out step e), at least one shaft bearing projection be mounted on the flap housing in the area of at least one shaft opening, preferably by means of welding.

The present invention further pertains to a method for manufacturing an exhaust gas flap, especially for the exhaust gas stream of an internal combustion engine, comprising the steps: A) Manufacturing of a flap carrier using a method for manufacturing a flap carrier according to the present invention, B) insertion of a pivot shaft into at least one, preferably into two shaft openings provided at the flap carrier, C) mounting of at least one, preferably two flap wings of a flap diaphragm at the pivot shaft such that the at least one flap wing is in contact with the stop ring in a closed position of the flap diaphragm, and D) coupling of a flap drive for the flap diaphragm with one end area of the pivot shaft protruding over the flap housing.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings, a method, with which a flap carrier for an exhaust gas flap, as it is shown, for example, in FIG. 1, can be manufactured, is described below with reference to FIGS. 2 through 6. Reference can be made to the above explanations concerning FIG. 1 with regard to the basic configuration of the exhaust gas flap configured with such a flap carrier to be manufactured according to the present invention.

Figure 2:
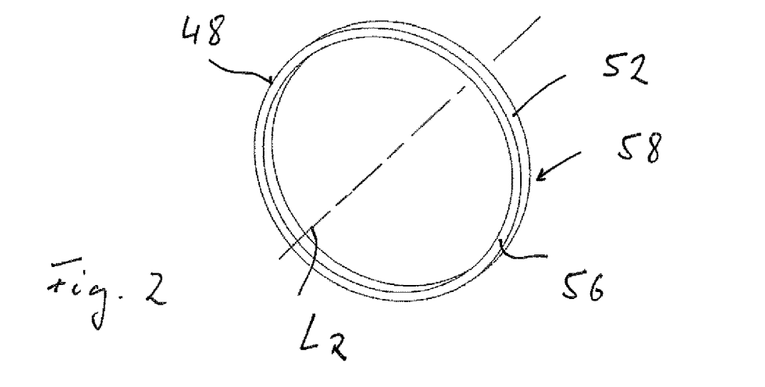
FIG. 2 is a perspective view of a stop ring provided for the configuration of a flap carrier of an exhaust gas flap according to the invention.
Figure 3:
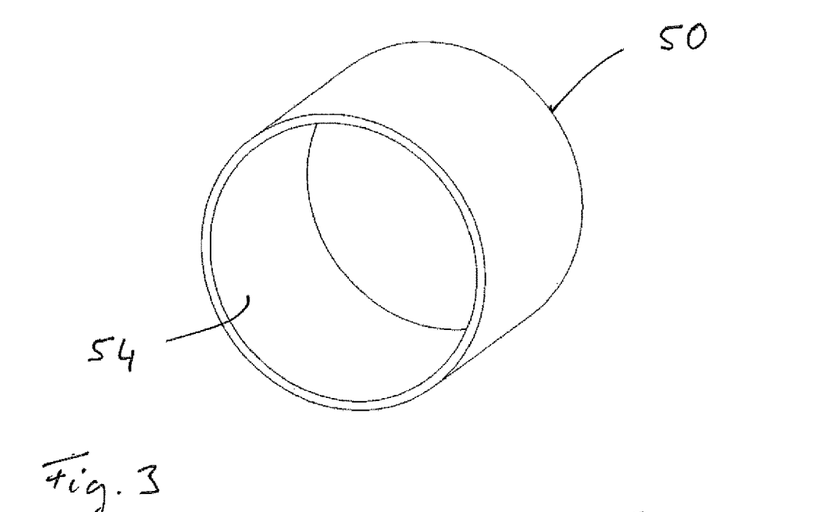
FIG. 3 is a perspective view of a flap housing provided for the configuration of the flap carrier of an exhaust gas flap according to the invention.
Figure 5:
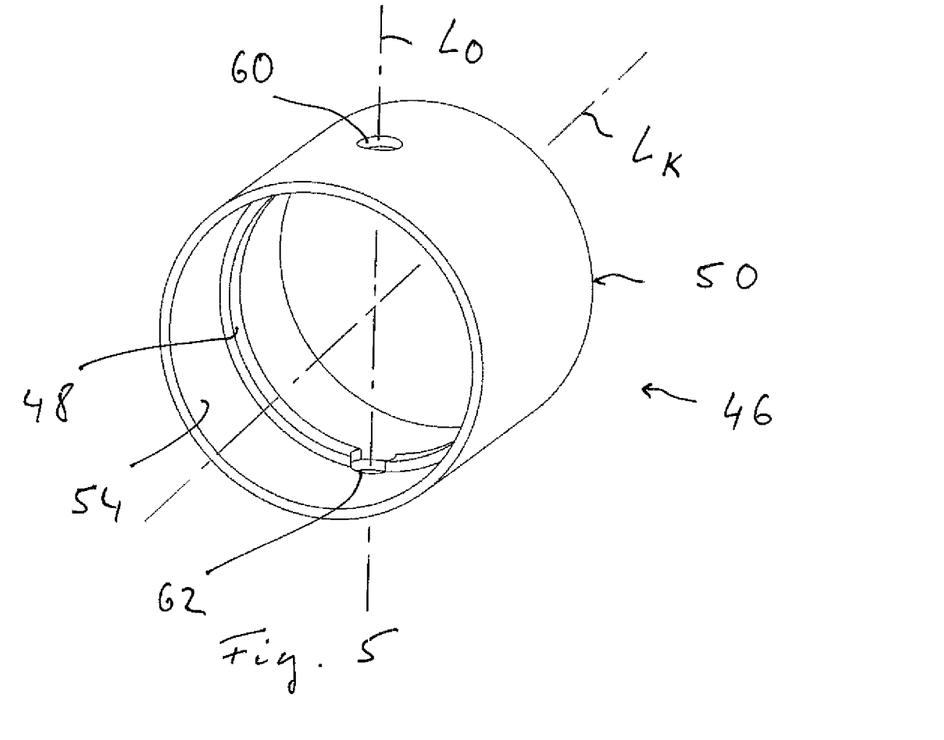
FIG. 5 is a perspective view of a flap carrier with shaft openings inserted into same comprising the flap housing and the stop ring according to the invention.

FIGS. 2 and 3 show the essential components of a flap carrier 46, which is then shown assembled in FIG. 5, for an exhaust gas flap, for example, for an exhaust gas flap of FIG. 1. A stop ring 48 shown in FIG. 2 and a flap housing 50 shown in FIG. 3 and essentially providing a housing of the flap carrier 46, which are each made of metallic material, are provided as essential components for the configuration of the flap carrier 46. In the example shown in FIG. 2, the stop ring 48 is configured as a closed ring and has, for example, a circular ring-like shape. The stop ring 48 is configured with outer surfaces including an outer circumferential surface 52, which preferably has an essentially cylindrical shape, at an outer circumferential area thereof.

The flap housing 50 may be configured as a tube section which is likewise provided with a circular ring-like structure, with an essentially cylindrical inner surface 54 at least in the area, in which the stop ring 48 is to be mounted. In this case, the stop ring 48 and the flap housing 50 are dimensioned coordinated with one another such that the stop ring 48 can be inserted into the flap housing 50 in a manner essentially free from backlash, so that the outer surface 52 along the entire circumference of the stop ring 48 is in contact with the inner surface 54 of the flap housing 50 in a manner essentially free from backlash.

The stop ring 48 is provided dimensioned such that the stop ring 48 has such a dimension in the direction of a ring longitudinal axis $L_R$ that the two axially oriented end faces 56, 58 of same have such an axial distance to one another that when the exhaust gas flap is assembled, the two flap wings 28, 30 interact with these two end faces 56 58, i.e., they are each in contact with these end faces 56, 58 when the flap diaphragm 24 is positioned in the closed position.

After providing the stop ring 48 and the flap housing 50, the stop ring 48 is inserted into the flap housing 50 and is arranged at a position corresponding to its installed position to be provided in the finished state in a next working step. It can be ensured by means of aids, e.g., clamping elements or the like, that the stop ring 48, which is not yet permanently connected to the flap housing 50 in this state, is no longer displaced after being arranged in the desired position. The stop ring 48 is then subsequently fixed to the flap housing 50, for example, by means of welding, preferably by means of laser welding. In this case, a fillet weld formed in the area of one or both end faces 56, 58 at the transition to the inner surface 54. In order to avoid a mutual interference with the flap wings 28, 30 to be brought into contact with these end faces 56, 58, provisions may, for example, also be made for the fillet weld to be formed in association with each end face 56 or 56 in the circumferential area in which no flap wing is interacting with this end face. A welding of the housing outer side through the flap housing 50, for example, by means of laser welding, is also possible.

Figure 4:
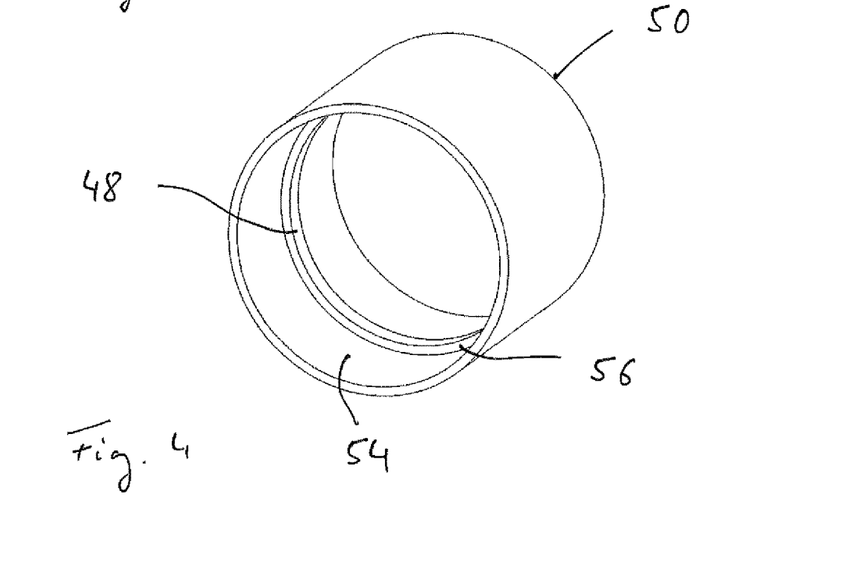
FIG. 4 is a perspective view of the stop ring inserted into the flap housing and fixed to the flap housing according to the invention.

After this state, which is shown in FIG. 4, in which the stop ring 48 is permanently connected to the flap housing 50, is reached, shaft openings 60, 62 are inserted from the outside at positions which are located diametrically opposed to one another in relation to a flap housing longitudinal axis $L_K$, and indeed such that they pass through both the flap housing 50 and the stop ring 48. An opening longitudinal axis $L_O$, which is essentially oriented at right angles to the flap housing longitudinal axis $L_K$ and correspondingly also to the ring longitudinal axis $L_R$, corresponds here essentially to the pivot axis A of the pivot shaft 16 in FIG. 1, which is provided in the assembled state.

As is illustrated in FIG. 5, the shaft openings 60, 62 are inserted such that the opening longitudinal axis $L_O$ thereof is in a central area of the stop ring 48 in the direction of the ring longitudinal axis $L_R$. This means that in the axial direction, each of the end faces 56, 58 has the same axial distance to the opening longitudinal axis $L_O$ and thus also to the pivot axis A of the pivot shaft 16. This guarantees that each of the flap wings 28, 30 mounted or to be mounted on the pivot shaft 16 can each interact with one of the end faces 56, 58 for providing a flow seal, wherein a configuration that is essentially point-symmetrical or axially symmetrical in relation to the pivot axis A or the opening longitudinal axis $L_O$ is obtained here. The two flap wings 28, 30 are axially offset in relation to one another in this case, so that, for example, the flap wing 28 shown on the left-hand side in FIG. 1 can interact with the end face 56, while the flap wing 30 shown on the right-hand side in FIG. 1 can interact with the end face 58.

Figure 1:
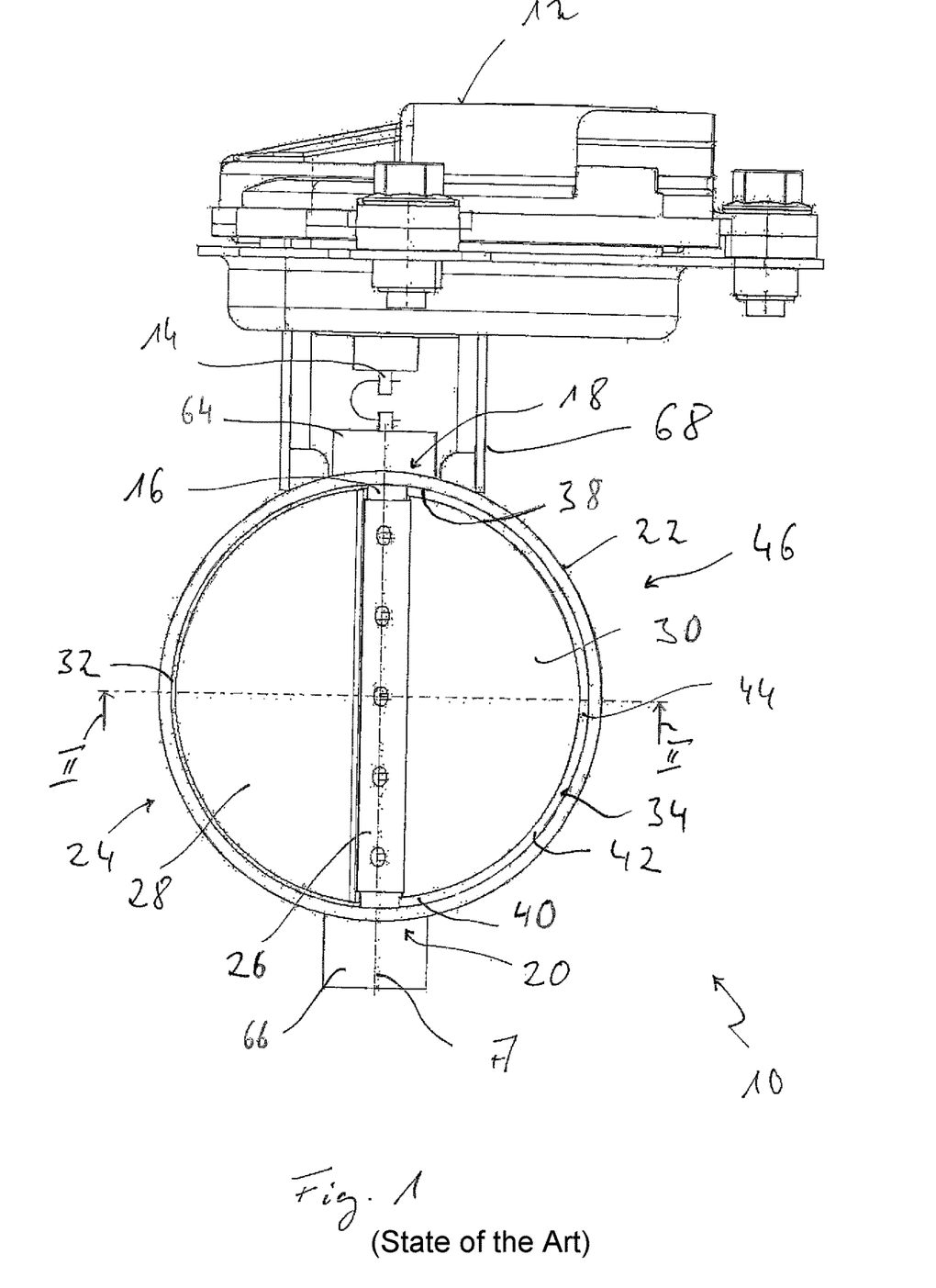
FIG. 1 is a side view of an exhaust gas flap with associated flap drive known from the state of the art.

Due to the insertion of the shaft openings 60, 62, the opening diameter of which is greater than the axial extension of the stop ring 48 in the direction of the ring longitudinal axis $L_R$, the stop ring is split into the two wing stops 32, 34 that have a segment-like configuration and are shown in FIG. 1. Since the stop ring 48 is, however, inserted as a single component into the flap housing 50, the assembly process can be carried out in an especially simple manner, which further contributes to the shaft openings being inserted both into the flap housing 50 and into the stop ring 48 only after the fixing of the stop ring 48 to the flap housing 50, preferably by means of laser cutting. It is thus not necessary to ensure an exact alignment of same or of ring segments in relation to the openings in the flap housing 50 during the installation of the stop ring 48 into the flap housing 50.

After the insertion of the shaft openings 60, 62, shaft bearing projections 64, 66, which can be seen in FIG. 1, are mounted on the outer side of the flap housing 50 in association with the two shaft openings 60, 62. These shaft bearing projections 64, 66, which have, for example, a tubular or an essentially cylindrical configuration, may be fixed, centered in relation to the opening longitudinal axis $L_O$, to the outer side of the flap housing 50, for example, by means of welding. Shaft bearings, and preferably roller body bearings, for the pivot shaft 16 can be inserted into these shaft bearing projections 64, 66 in order to be able in this manner to mount the pivot shaft 16 pivotably on the flap carrier 46 in an essentially friction-free manner.

During the assembly of the exhaust gas flap shown in FIG. 1, after the flap carrier 46 has been manufactured in the manner described above, the pivot shaft 16 and the shaft bearings to be mounted in the shaft bearing projections 64, 66 can be mounted. In its axial end area 18, the pivot shaft 16 then protrudes, for example, over the shaft bearing projection 64 in order to be coupled there with the drive shaft 14 of the flap drive 12. The flap drive 12 itself may be or become fixed, for example, likewise by means of welding, to the outer side of the flap housing 50 by means of a carrier 68 associated with this flap drive 12.

Figure 6:
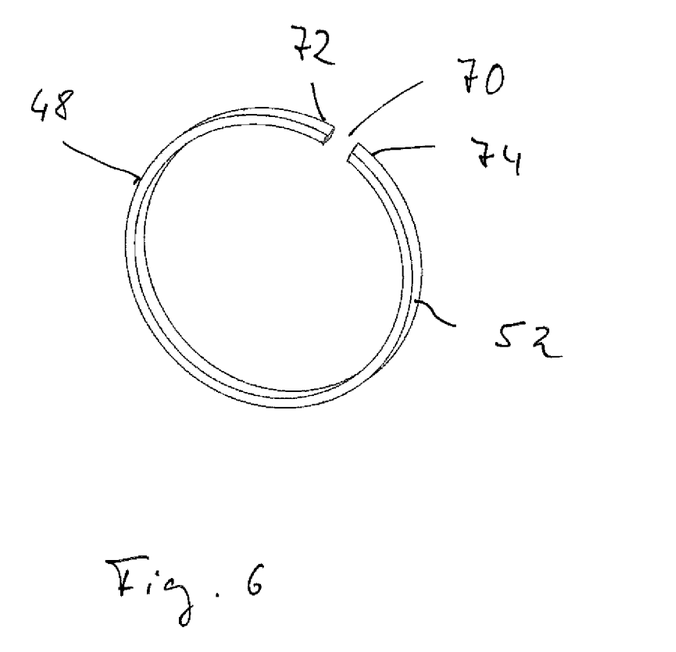
FIG. 6 is a perspective view of an alternative configuration of the stop ring according to the invention.

FIG. 6 shows an alternative configuration of a stop ring 48. FIG. 6 shows the stop ring as an open ring with an interruption area 70. This interruption area is dimensioned in the circumferential direction of the stop ring 48 such that it is smaller than the corresponding dimensioning of the shaft openings or of at least one of the shaft openings 60, 62 to be provided in the flap carrier 46.

Figure 7:
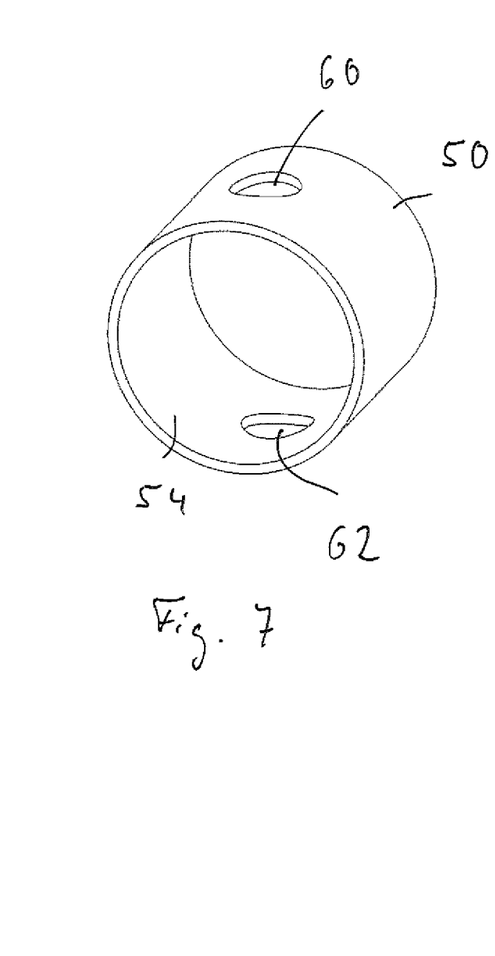
FIG. 7 is a perspective view of a flap housing with shaft openings provided in the flap housing provided for the configuration of a flap carrier of an exhaust gas flap according to the invention.

The stop ring shown in FIG. 7 may first be provided such that it has an outer dimension, e.g., an outer diameter that is slightly greater than the inner dimension, for example, the inner diameter of the flap housing 50 in an uncompressed state. For inserting the stop ring 48 into the flap housing 50, the stop ring 48 is compressed in the circumferential direction and thus in the radial direction. After inserting the stop ring 48 into the flap housing 50, this axial compression can be released, so that the stop ring 48 will spread open radially and will, under prestress, come into contact with the inner surface 54 of the flap housing 50. In this state, the stop ring 48 is held, in principle, fixed in relation to the flap housing 50, but can be brought into the position corresponding to the installed position by means of corresponding exertion of force. Further steps for mounting the stop ring 48 in relation to the flap housing 50 for establishing the connection in substance are not necessary.

When using such an open stop ring 48, it is ensured during insertion of the shaft openings 60, 62 or already during the insertion of the stop ring 48 into the flap housing 50 that one of the shaft openings 60, 62 will be positioned in the finished flap carrier 46 where the interruption area 70 will be positioned after inserting the stop ring 48 into the flap housing 50 and fixing the stop ring 48 to the flap housing 50, i.e., after establishing the state shown in FIG. 4. The shaft opening 60 or 62 then to be formed in this area is inserted or is dimensioned such that it is greater than the circumferential extension of the interruption area 70 when the stop ring 58 has been inserted into the flap housing 50. For example, provisions could be made for this circumferential extension of the interruption area 70 to essentially correspond to the axial extension of the stop ring 48 or to be smaller, but to be at least smaller than the cross-sectional dimension of the shaft opening to be introduced. If the shaft opening 60 or 62 is then inserted into the flap housing 50 or the stop ring 48, the stop ring 48 is also provided in the end areas 72, 74 of the stop ring 48 forming between themselves the interruption area 70 with the contour of the end areas 72, 74 corresponding to the cross-sectional contour of the shaft opening 60 or 62 to be formed there. In the area of the other shaft opening to be formed, the stop ring 48 is split into two segments providing the wing stops 32, 34 in the manner described above.

Figure 8:
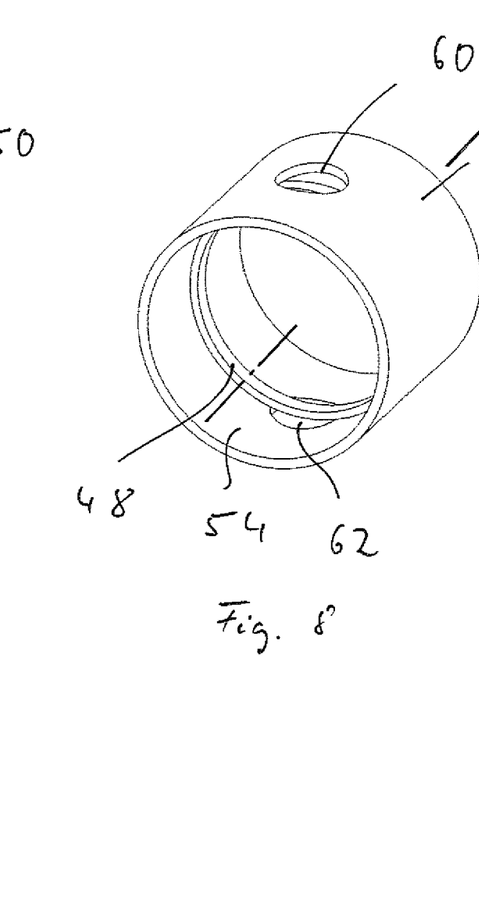
FIG. 8 is a perspective view of the flap housing of FIG. 7 with a stop ring inserted into same according to the invention.
Figure 9:
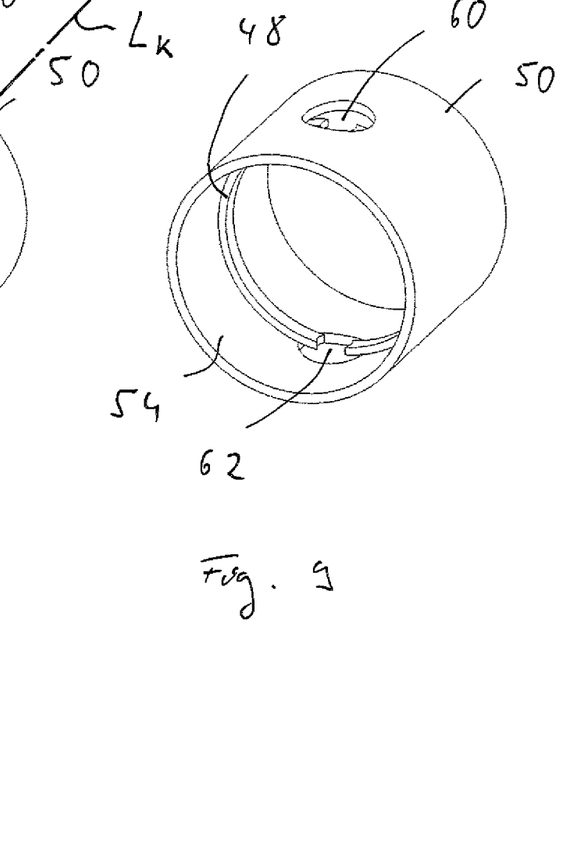
FIG. 9 is a perspective view of the flap housing of FIG. 7 with stop ring inserted in it and shaft openings inserted into same according to the invention.

FIGS. 7 through 9 illustrate an alternative procedure for configuring a flap carrier for an exhaust gas flap.

FIG. 7 shows the flap housing 50 before the stop ring 48 is inserted into same and then fixed to it. Shaft openings 60, 62 are already inserted into this flap housing 50, for example, by means of laser cutting, through which the pivot shaft 16, which is shown, for example, in FIG. 1, will extend after assembly of the exhaust gas flap.

After the flap housing 50 has been provided with the shaft openings 60, 62 already provided in it, the stop ring 48 is inserted into the flap housing 50 either as an open ring or as a closed ring, so that it is in contact with the inner surface 54 of same and is fixed to it, for example, by means of laser welding. In this connection, the stop ring is positioned such that it is positioned centrally in the flap housing 50 in the direction of the flap housing longitudinal axis $L_K$ in relation to the shaft openings 60, 62. After positioning and fixing the stop ring 48 in this position, the shaft openings 60, 62 are also inserted into the stop ring 48. In this case, the shaft openings 60, 62 preset in the stop ring 48 have a smaller diameter or a smaller transverse dimension than in the flap housing 50. FIG. 9 illustrates this.

After inserting the shaft opening 60, 62 also into the stop ring 48, the shaft bearing projections or bearing bushes 64, 66, already described above with reference to FIG. 1, can be inserted into the shaft openings 60, 62, so that they are located on the stop ring 48 and thus do not protrude over the inner surface 54 of the flap housing 50. In this connection, the shaft bearing projections 64, 66 preferably have a contour on one of their end faces, which is adapted to the curved contour of the inner surface 54, and thus to the curved contour continuing the inner surface 54. The shaft bearing projections 64, 66 may then be fixed to the flap housing 50, for example, by means of laser welding. The flap carrier is then finished and ready for insertion of the pivot shaft 16.

In the manner described above, it is possible to manufacture a flap carrier for an exhaust gas flap in an especially simple manner such that a flap diaphragm configured with two flap wings can reliably interact with the stop ring in order to provide a reliable seal of the flow path in the interior of the flap housing in a closed position of the flap diaphragm by means of flap wings in contact with the stop ring or with segments of same. Thus, the acoustic tightness of an exhaust gas flap configured with such a flap carrier is also markedly improved, which leads to a correspondingly reduced noise level outside the exhaust gas flap or the flap carrier. This especially contributes to the fact that the stop ring can be shaped or dimensioned in the area of the shaft openings by means of the later insertion of these shaft openings into the flap housing and the stop ring such that it can be led directly to the outer circumference of the pivot shaft to be inserted into these shaft openings and almost no open intermediate space remains for the passage of exhaust gases and sound.

While specific embodiments of the invention have been shown and described in detail to illustrate the application of the principles of the invention, it will be understood that the invention may be embodied otherwise without departing from such principles.

What is claimed is:

1. A method for manufacturing a flap carrier for an exhaust gas flap, for an exhaust gas stream of an internal combustion engine, the method comprising the steps of:
    providing a flap housing;
    providing a stop ring as an open ring with an interruption area and with an external dimension oversize in relation to an internal dimension of the flap housing;
    inserting the stop ring into the flap housing in a position corresponding to an installed position, comprising compressing the stop ring radially in relation to a ring longitudinal axis and holding the stop ring in the installed position by a spreading of the stop ring open radially against the flap housing, wherein a circumferential extension of the interruption area when the stop ring has been inserted into the flap housing is smaller than the cross sectional dimension of a shaft opening to be formed in the stop ring such as to pass through the stop ring in the interruption area;
    fixing the stop ring to the flap housing; and
    subsequently to fixing the stop ring to the flap housing, forming the shaft opening in the stop ring passing through the stop ring in the interruption area of the stop ring such as to have a circumferential extension that is greater than the circumferential extension of the interruption area when the stop ring has been inserted into the flap housing, the shaft opening being provided for a pivot shaft carrying a flap diaphragm with at least one flap wing.

2. The method in accordance with claim 1, wherein:
    the step of providing the flap housing comprises providing the flap housing with an inner surface, which is essentially cylindrical in at least some areas; or
    the step of providing the stop ring comprises providing the stop ring with an essentially cylindrical outer surface; or
    the step of providing the flap housing comprises providing the flap housing with an inner surface, which is essentially cylindrical in at least some areas and the step of providing a stop ring comprises providing the stop ring with an essentially cylindrical outer surface.

3. The method in accordance with claim 1, wherein the step of fixing the stop ring to the flap housing comprises welding of the stop ring to the flap housing.

4. The method in accordance with claim 1, wherein the step of providing the flap housing comprises providing the flap housing with at least one shaft opening.

5. The method in accordance with claim 1, wherein the step of forming the shaft opening in the stop ring comprises the forming of the shaft opening such that the shaft opening is positioned at a central position of the stop ring in the direction of the ring longitudinal axis.

6. The method in accordance with claim 1, further comprising a step of forming another shaft opening in the stop ring for the pivot shaft, the shaft opening and the another shaft opening being formed at positions located opposite one another in relation to a flap housing longitudinal axis of the flap housing.

7. The method in accordance with claim 1, wherein the step of forming the shaft opening in the stop ring comprises laser cutting the stop ring to form the shaft opening by laser cutting.

8. The method in accordance with claim 1, wherein subsequently to forming the shaft opening in the stop ring, mounting at least one bearing bush by welding the bearing bush on the flap housing in an area of the shaft opening.

9. A method for manufacturing an exhaust gas flap arrangement for an exhaust gas stream of an internal combustion engine, the method comprising the steps of:
    manufacturing of a flap carrier comprising the steps of:
        providing a flap housing;
        providing a stop ring as an open ring with an interruption area and with an external dimension oversize in relation to an internal dimension of the flap housing;
        inserting the stop ring into the flap housing in a position corresponding to an installed position, comprising compressing the stop ring radially in relation to a ring longitudinal axis and holding the stop ring in the installed position by a spreading of the stop ring open radially against the flap housing, wherein a circumferential extension of the interruption area when the stop ring has been inserted into the flap housing is smaller than the cross sectional dimension of a shaft opening to be formed in the stop ring such as to pass through the stop ring in the interruption area;
        fixing the stop ring to the flap housing; and
        subsequently to fixing the stop ring to the flap housing, forming the shaft opening in the stop ring passing through the stop ring in the interruption area of the stop ring such as to have a circumferential extension that is greater than the circumferential extension of the interruption area when the stop ring has been inserted into the flap housing;

inserting a pivot shaft into the at least one shaft opening provided at the flap carrier;

mounting at least one flap wing of a flap diaphragm at the pivot shaft such that the at least one flap wing is in contact with the stop ring in a closed position of the flap diaphragm; and coupling a flap drive for the flap diaphragm with one end area of the pivot shaft protruding over the flap housing.

10. The method in accordance with claim 9, wherein:
the step of providing the flap housing comprises providing the flap housing with an inner surface, which is essentially cylindrical in at least some areas; or
the step of providing the stop ring comprises providing the stop ring with an essentially cylindrical outer surface; or
the step of providing the flap housing comprises providing the flap housing with an inner surface, which is essentially cylindrical in at least some areas and the step of providing a stop ring comprises providing the stop ring with an essentially cylindrical outer surface.

11. The method in accordance with claim 9, further comprising a step of forming another shaft opening in the stop ring for the pivot shaft, the shaft opening and the another shaft opening being inserted at positions located opposite one another in relation to a flap housing longitudinal axis of the flap housing.

12. A method for manufacturing a flap carrier for an exhaust gas flap, for an exhaust gas stream of an internal combustion engine, the method comprising the steps of:
providing a flap housing;
providing an open ring comprising a ring longitudinal axis and an interruption area, wherein one end of the open ring is located at a spaced location from another end of the open ring to define an opening in the interruption area;
inserting the open ring into the flap housing in an installed position by compressing the open ring radially in relation to the ring longitudinal axis, wherein the open ring is maintained in the installed position after the open ring spreads open radially against the flap housing, the opening having a first dimension when the open ring is in the installed position;
fixing the open ring to the flap housing when the open ring is in the installed position; and
increasing the first dimension of the opening in the open ring after the open ring is fixed to the flap housing such that the opening has a second dimension to define at least a portion of a shaft opening for receiving at least a portion of a pivot shaft carrying a flap diaphragm with at least one flap wing, the second dimension being greater than the first dimension.

13. The method in accordance with claim 12, wherein the open ring comprises an open ring diameter prior to being inserted in the flap housing, the flap housing comprising an internal dimension, the open ring diameter being greater than the internal dimension of the flap housing.

* * * * *